W. R. YEAGLE.
SWINGLETREE AND NECK YOKE.
APPLICATION FILED MAR. 16, 1911.
994,491.
Patented June 6, 1911.
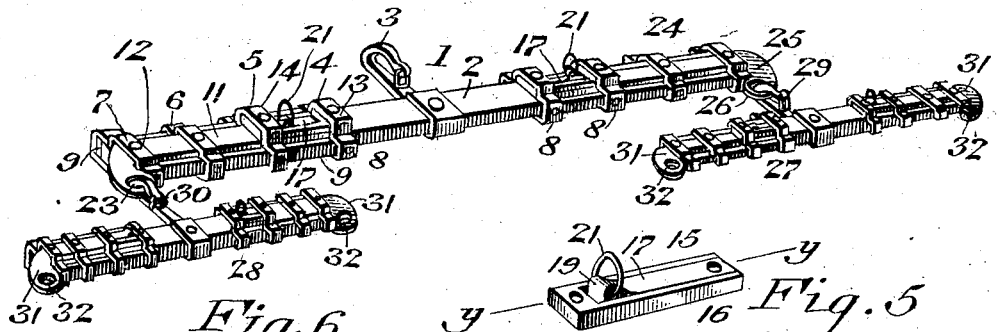
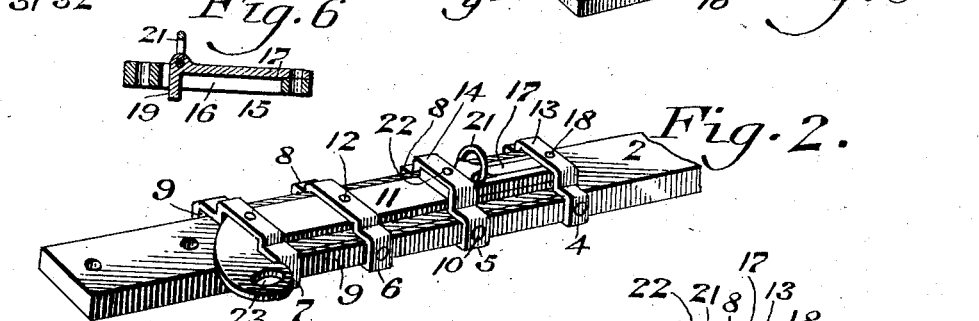
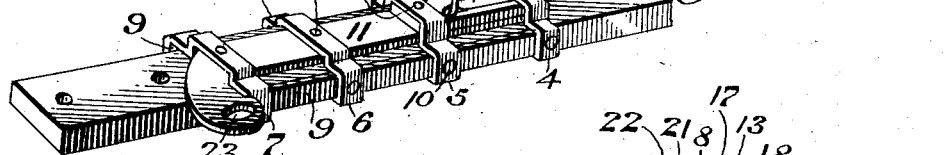
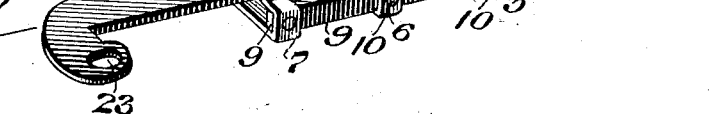
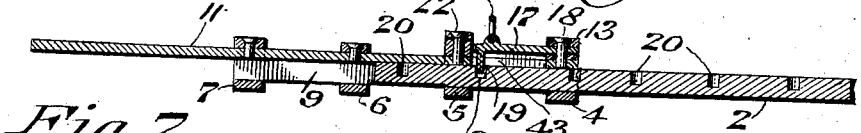
WITNESSES
INVENTOR
Walter R. Yeagle
ATTORNEYS

UNITED STATES PATENT OFFICE.

WALTER R. YEAGLE, OF EDDINGTON, PENNSYLVANIA.

SWINGLETREE AND NECK-YOKE.

994,491. Specification of Letters Patent. Patented June 6, 1911.

Application filed March 16, 1911. Serial No. 614,776.

*To all whom it may concern:*

Be it known that I, WALTER R. YEAGLE, a citizen of the United States, residing at Eddington, in the county of Bucks, State of Pennsylvania, have invented a new and useful Swingletree and Neck-Yoke, of which the following is a specification.

My invention consists of a novel construction of an adjusting device which is especially adapted for application to either a double tree, swingle tree, or neck yoke, provision being made whereby a double tree, swingle tree, or both can be quickly lengthened or shortened by unskilled labor according to requirements, whereby the distance apart of the draft animals which are employed to pull plows, cultivators, or the like with respect to each other, or with respect to the center of the double tree or the swingle tree can be quickly regulated or adjusted according to requirements, so as to enable various agricultural implements, such as plows, cultivators, or the like to be readily used to the best advantage, between rows of bushes, hedges, and the like, of varying widths apart, my novel device being also especially adapted for instant and ready adjustment, for enabling the user to plow or cultivate close to fences or boundary lines, as will be apparent to those skilled in the art.

To the above ends, my invention consists of novel adjusting means which are adapted to be applied to a double tree, or swingle tree, the same consisting of a series of collars which are coupled and reinforced at their opposite side portions, by means of preferably-parallel bars or strips secured thereto, said collars also having secured thereto an extension or adjusting bar or member which is adapted to be attached to either a swingle tree hook, or said device when applied to the swingle trees is adapted to be secured to the traces of the draft animal, which may be employed.

My invention further consists of a novel construction of a locking device, which is applied to the adjusting device, said locking device consisting of a frame, the ends of which are preferably secured between a pair of collars, means being provided for enabling the catch of my novel locking device to be quickly applied to or disengaged from a coöperating seat in the double tree or swingle tree.

My invention further consists of other novel features of construction, all as will be hereinafter fully described and pointed out in the claims.

For the purpose of explaining my invention, I have shown in the accompanying drawing one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of these instrumentalities as herein shown and described.

Figure 1 represents a perspective view of a double tree and attached swingle tree embodying my invention. Fig. 2 represents on an enlarged scale, a perspective view of one end of the double tree or swingle tree seen in Fig. 1. Fig. 3 represents a perspective view similar to Fig. 2 showing the slide bar to which a trace is adapted to be attached in a different position. Fig. 4 represents a section on line $x$—$x$ Fig. 3, showing the manner of locking the slide in its different positions. Fig. 5 represents a perspective view of the locking device employed in detached position. Fig. 6 represents a section on line $y$—$y$ Fig. 5. Fig. 7 represents a perspective view of a neck yoke having my invention applied thereto.

Similar numerals of reference indicate corresponding parts in the figures.

Referring to the drawings:—1 designates a double tree, comprising the body portion 2, having the hook or its equivalent 3 attached thereto, which latter may be of the usual construction. Upon each extremity of the body 2, I mount the collars or straps 4, 5, 6 and 7, said collars preferably encircling said body 2 and being preferably provided with side offsets 8, which contain the substantially parallel side strips or braces 9, which latter couple said collars by the rivets, screws, or other fastenings 10. The collars 6 and 7 are constructed substantially alike and are pinned to the slide bars 11 by the rivets 12. The collars 4 and 5 are similar to the collars 6 and 7, but have their central portions 13 raised somewhat to receive the ends of the frame 15, the latter consisting of a body portion 16 in which one end of the flat spring 17 is secured by means of the rivet 18, the end or nose 19 of said pin being deflected downwardly serving as a catch and adapted to pass freely through a recess 43 in the bar 11, as will be understood from Fig. 4, and enter one of the recesses 20, as likewise understood from Fig. 4, said end serving as a spring catch and being raised or manipulated by the ring 21 or its equivalent. The pin or other fastening 22 in conjunction with the pin 18 serves to hold the frame 15 in position, as will be understood from Fig. 4, so that the collars 4, 5, 6 and 7, the side strips 9, the slide bar 11 and the frame 15 carrying the locking device, can all be shifted in unison, along the body 2 of the double tree and locked in the desired position by the catch 19, so that the position of the eye 23, with respect to the central hook 3 can be adjusted at will according to requirements.

The foregoing description applies to the mechanism at the left of the double tree, seen in Fig. 1, and as the mechanism 24 seen at the right of Fig. 1 is substantially identical, a description of one will suffice for both, it being apparent that the eye 26 of the slide bar 25 is capable of adjustment in the same manner and to the same extent as the eye 23.

27 and 28 designate swingle trees which are supported in the eyes 26 and 23 by the hooks 29 and 30 respectively. Each swingle tree is provided at its extremity with a slide bar 31, having an eye 32 therein with which the traces engage in the usual manner, each of said slide bars being constructed and supported, adjusted and locked in the same manner, as already described with reference to the left hand portion of Fig. 1, and to Figs. 2, 3, and 4, so that a repetition of the detailed construction is deemed to be unnecessary. It will however be clearly apparent that the raising of the spring 17 in any of the locations seen in Fig. 1, will enable the coacting slide bar on the double tree or swingle trees to be shifted to the right or left, or toward or away from each other as occasion may require, which makes my invention especially applicable to use with various farming implements, such as plows, cultivators, and the like in cases where rows of plants, bushes, hedges and the like vary in width apart. I am also enabled to work closer to fences and boundaries, by proper adjustment of the slide bars, as will be apparent, and since the slide bars one in each instance are secured to the collars and the latter braced by the side strips 9, and the locking device firmly held in the collars 4 and 5, it will be seen that a very strong, light and efficient device is produced, which can be instantly adjusted and cannot readily get out of order.

In Fig. 7, I have shown my invention as adapted to a neck yoke, wherein 34 designates the body portion having an eye or swivel 35, to be attached to the pole or tongue of the plow, cultivator, or the like.

36 and 37 designate collars which hold the locking device 38 in position, the same being constructed, as shown in Figs. 2 to 6, already described. 39 and 40 designate the two outer collars, all of said collars being secured to the side strips 41, the collar 39 having the eye 42 for the breast chains to engage with in the usual manner. Upon the raising of the spring 38, the parts 36, 37, 38, 39, 40, and 41 and 42, can be adjusted to the right or left as may be desired.

It will now be apparent that I have devised a novel and useful construction of a swingle tree and neck yoke which embodies the features of advantage enumerated as desirable in the statement of the invention and the above description, and while I have, in the present instance, shown and described a preferred embodiment thereof which has been found in practice to give satisfactory and reliable results, it is to be understood that the same is susceptible of modification in various particulars without departing from the spirit or scope of the invention or sacrificing any of its advantages.

The double tree may be lengthened and an additional swingle tree with the necessary appurtenances applied for a three-horse gear when so desired.

Having thus described my invention, what I desire to secure by Letters Patent, is:—

1. In a device of the character stated, a body portion, an adjustable device therefor including slidable collars, substantially parallel strips secured to said collars, and a locking device comprising a frame having its ends secured in said collars, and a spring catch having one end secured in said frame and its other end deflected inwardly and adapted to engage a seat in said body portion.

2. In a device of the character stated, a body portion, a plurality of sliding collars thereon, substantially parallel strips to which said collars are secured, and a locking device comprising a frame having its ends secured to a pair of said collars, and a suitable catch having one end secured to one of said collars and its other end deflected inwardly and engaging a coacting seat in said body portion.

3. In a device of the character stated, a body portion having thereon a plurality of sliding collars, side strips secured oppositely to each other in said collars and adapted to engage the edges of said body portion, a bar also secured to said collars, and a locking device supported on said bar and having a catch adapted to engage a seat in said body portion.

4. In a device of the character stated, a body portion, a plurality of collars slidingly mounted thereon, side strips located oppositely to each other and secured to said collars, a slide bar also secured to said collars, a locking device consisting of a frame also secured to said collars, and a catch having one end secured in said frame, and its other end deflected inwardly and adapted to engage a seat in said body portion, said collars, strips and locking device being telescopically adjustable on said body portion.

5. In a device of the character stated, a tree comprising a body portion having on each end thereof, an adjustable device, consisting of a plurality of collars, reinforcing devices for said collars, a bar attached to said collars and having an eye in the end thereof, a frame secured upon said bar and collars, and a suitable catch mounted in said frame and adapted to engage a seat in said body portion.

6. An adjustable tree composed of a body portion, an extension member thereon, a plurality of collars the latter being firmly connected with said member and freely engaging said body portion, and means for retaining said extension member in set position, said means including a resilient member and a ring connected therewith.

7. In a device of the character stated, a body portion, an extension member thereon, a plurality of collars, the latter being firmly connected with said member, and freely embracing said body portion, pieces adapted to couple said collars, and slidable therewith on opposite sides of said body portion.

8. An adjustable tree composed of a body portion, an extension member, collars connected with the latter and freely engaging the former, means for coupling and bracing said collars, said means being interposed between said collars and body portion, they being firmly connected with the collars and slidable on the body portion, and means carried by two adjacent collars for securing the body portion and extension member in adjusted position.

9. An adjustable tree composed of a body portion, a bar slidable therein, collars connected with said bar and freely engaging said body portion, and a fastening on said bar adapted to engage said body portion, said fastening being composed of a catch and a frame therefor, the latter being secured in position by the adjacent collars connected with said bar.

10. An adjustable tree composed of a body portion, an extension bar thereon, collars connected with said bar and freely engaging said body portion, members adapted to couple and reinforce said collars, the same being freely movable on said body portion, a frame secured to a plurality of said collars, and yielding means carried by said frame and adapted to interlock with said body portion to maintain the parts in their adjusted position.

WALTER R. YEAGLE.

Witnesses:
ALAN CONELY-MILDMAN,
WALTER C. VANDEGRIFT.

---

Copies of this patent may be obtained for five cents each, by addressing the "Commissioner of Patents, Washington, D. C."